United States Patent [19]
Smith

[11] 3,770,070
[45] Nov. 6, 1973

[54] UTILITY VEHICLE

[76] Inventor: Jimmie D. Smith, 417 Hanover St., Irving, Tex.

[22] Filed: July 29, 1971

[21] Appl. No.: 167,349

[52] U.S. Cl............... 180/13, 180/14 R, 180/19 R, 254/86 R, 280/150.5, 280/490 R
[51] Int. Cl............................................. B62d 53/04
[58] Field of Search .................. 180/12, 13, 14, 19, 180/26, 52, 11; 280/150.5, 425, 490, 150 A; 254/86 R

[56] References Cited
UNITED STATES PATENTS
2,471,521    5/1949    Galey.............................. 280/490 R
3,166,141    1/1965    Shields et al...................... 180/19 R Primary Examiner—Kenneth H. Betts
Attorney—Thomas D. Copeland, Jr.

[57] ABSTRACT

A utility vehicle and vehicle mower that is power propelled, and may be moved by an individual to both lift and transport extremely heavy vehicles, such as trailers, when the vehicle has been disconnected from its prime mover. In one embodiment, the mover includes an adjustable power lifting means that may extend a distance under the trailer tongue for increased stability. In another embodiment, the mover mechanism is integral with the trailer tongue itself.

12 Claims, 12 Drawing Figures

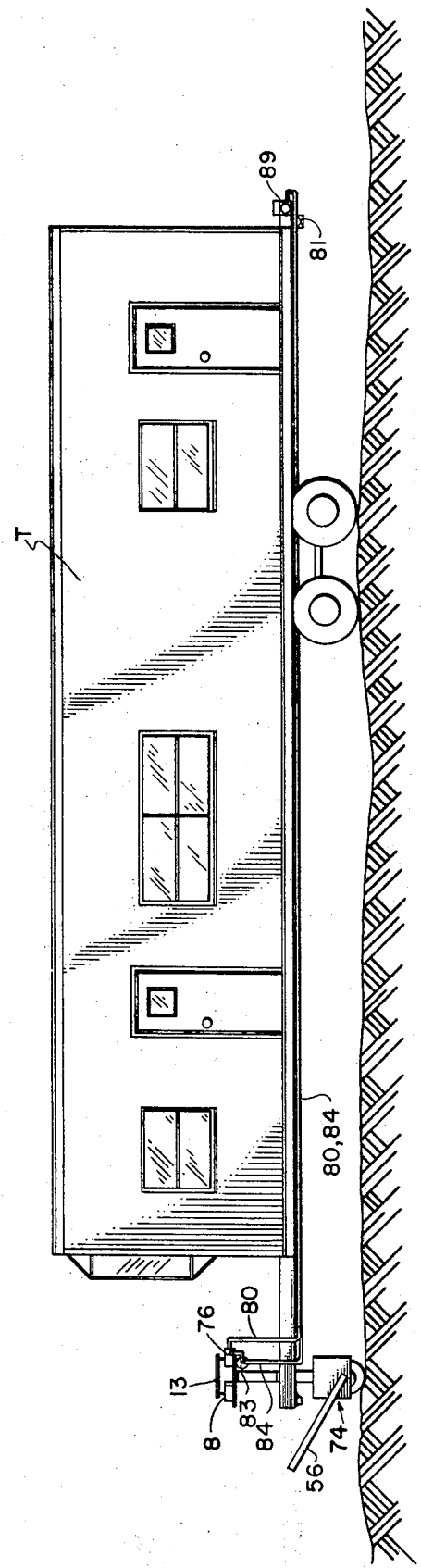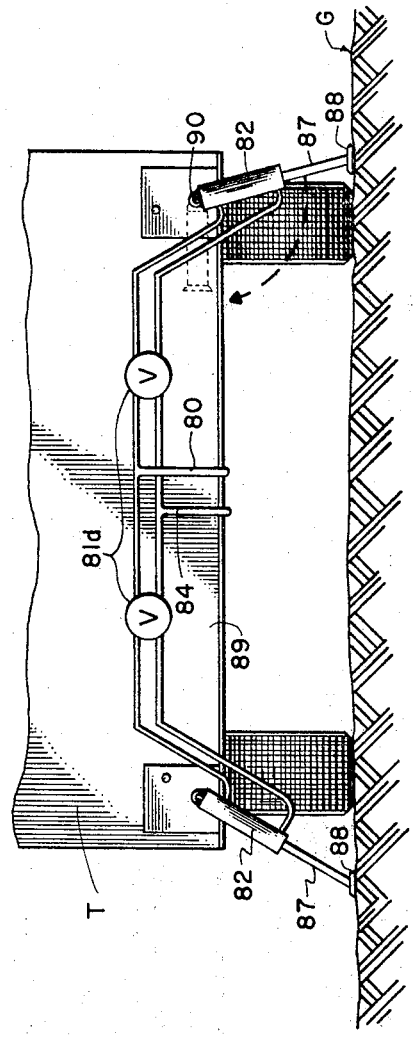
FIG. 6
FIG. 7

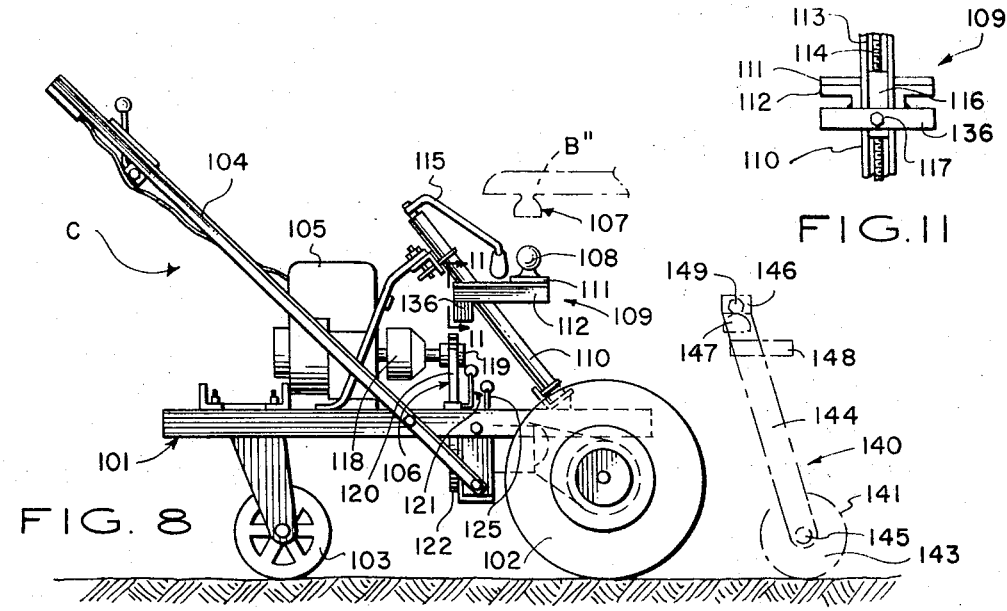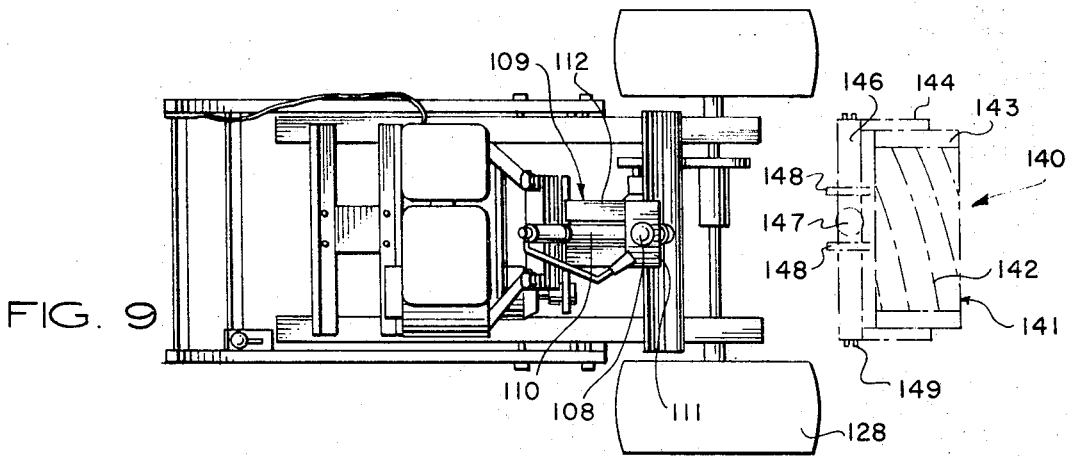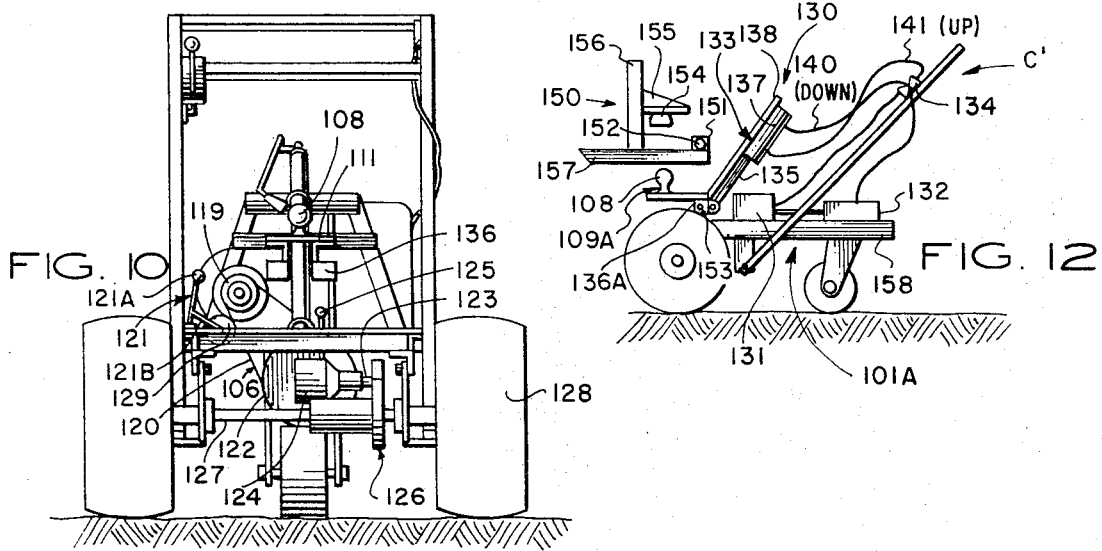

UTILITY VEHICLE

BACKGROUND OF THE INVENTION

1. Field of Invention

This invention relates generally to self-propelled utility machines, and more particularly to a unique machine which has for an important object the ability to pick up, guide, maneuver, transport and stow a vehicle that is detached from its prime mover.

2. Statement of the Prior Art

Prior art U.S. Pats. Nos. 3,356,172 to Peckham, et al., and 3,439,764 to Kimball are representative of the art of power propelled vehicle movers and relate to the Applicant's first embodiment shown in FIGS. 1 - 7.

Prior art U.S. Pats. Nos. 3,166,141 to Shields, 3,150,734 to Duggar, 3,156,315 to Hawgood, 3,370,666 to Holtzclaw, 3,179,196 to Richardson, and 3,417,833 to McRae are representative of the art of power propelled vehicle movers and relate to the Applicant's second embodiment shown in FIGS. 8–12.

SUMMARY OF THE INVENTION

A principal object of this invention is to provide a power propelled, power lifting, vehicle mover which is of a construction to permit the vehicle to be readily guided by an individual while power is applied selectively to the drive wheel and lifting mechanism.

An object of one embodiment of this invention is to provide a mechanism mounted on and supported by the vehicle to be moved and wherein the power drive wheel is stowed under the vehicle itself when not in use.

An object of another embodiment of this invention is to provide a separate self propelled mover vehicle that may have both a power lift and a power drive and wherein the power lift is so constructed as to permit it to be run under the tongue or other portion of a vehicle to be moved and be coupled thereto and thereafter lift the vehicle off its support and move the vehicle to another location.

A still further object of this invention is to provide a vehicle mover mechanism in which virtually no manual effort is required to lift, propel and stow said mechanism, and one which will be extremely useful for the purposes intended.

And another object is to provide a power vehicle which may be selectively used for moving a vehicle, moving loads, and operating other tools.

And yet another object is to provide a trailer mover which will permit the operator to move the trailer to the prime mover instead of having to back the prime mover to the trailer.

BRIEF DESCRIPTION OF THE DRAWING

FIG. 6 is a side elevational view of a vehicle using the mover of the first embodiment in combination with vehicle levellers.

FIG. 7 is a rear elevational view of the device of FIG. 6.

FIG. 8 is a side elevational view of another embodiment of this invention.

FIG. 9 is a top plan view of the device of FIG. 7.

FIG. 10 is a front elevational view of the device of FIG. 7.

FIG. 11 is a detail view taken at 11—11 of FIG. 8 and showing the lift coupling between the lead screw and the hitch platform.

FIG. 12 is a side view showing a modified structure using power means for the lifting mechanism of this embodiment.

DESCRIPTION OF PREFERRED EMBODIMENTS

Figure 1:
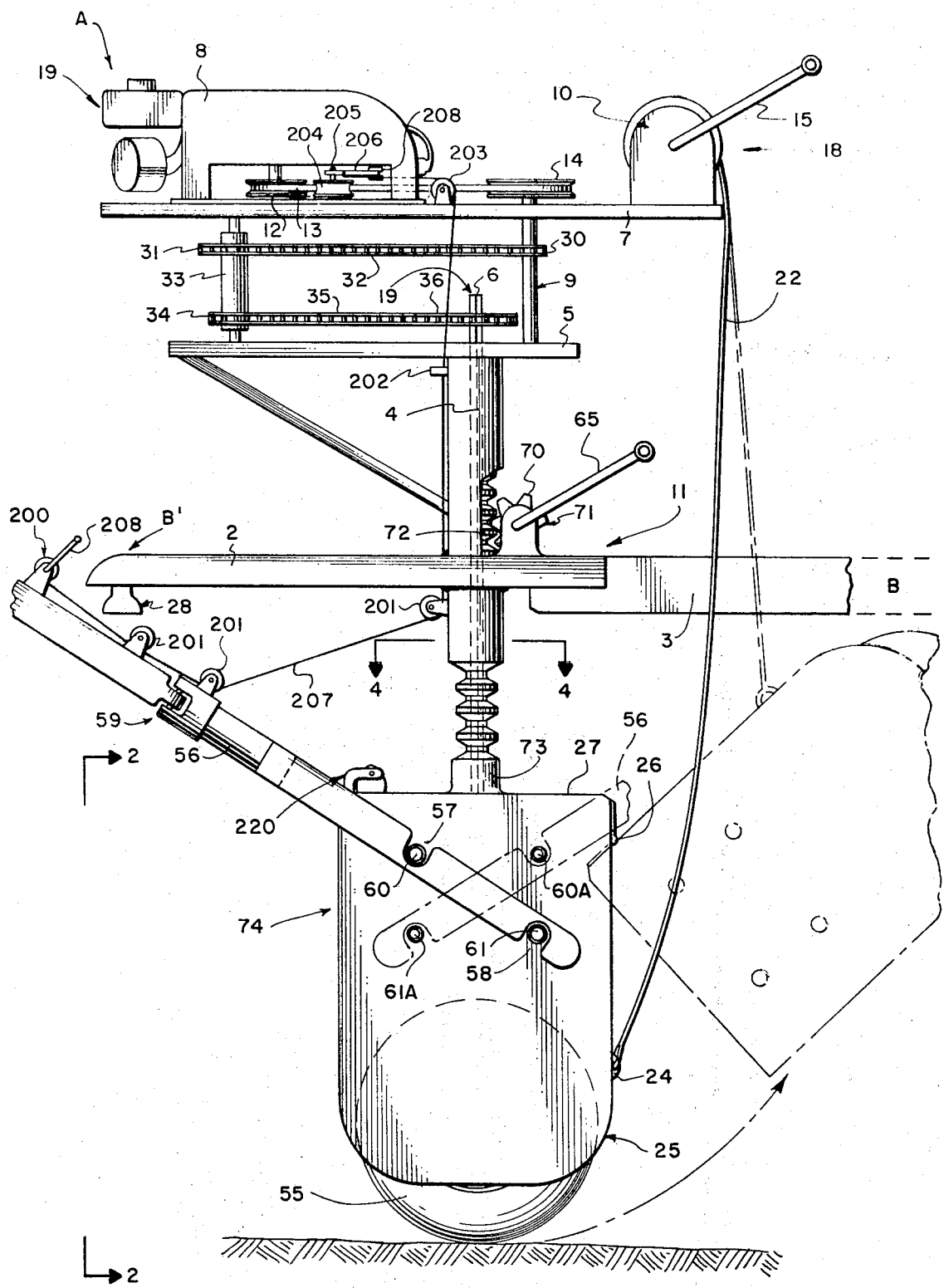
FIG. 1 represents a side elevational view of one embodiment of this invention shown in an operating mode.

Referring now more particularly to the characters of reference in the drawing, it will be observed that the assembled moving and lifting mechanism of FIG. 1 is referenced A, and this mechanism comprises one embodiment of this invention. The vehicle to be moved in this figure is referenced B, and is shown only as the trailer tongue 2 and A-frame 3.

A guide structure, such as vertical tube 4 extends thru the tongue portion 2 of the vehicle B and projects upward and thru submounting platform 5 and in so doing defines an opening thru which drive shaft 6 may extend. The top mounting platform 7 supports an internal combustion motor 8, drive shaft 9 and stowing cable winch 10. The mounting platforms 5, 7, as well as vehicle frame B support the lifting mechanism referred to generally at 11. Internal combustion motor 8 drives output pulley 12, which thru pulley belt 13, drives pulley 14 of driven shaft 9.

When actuated by handle 15 or hydraulic control valve 81a and hydraulic motor 16 (FIG. 5), cable 22 will be reeled in or paid out by cable winch 10. The cable 22 is anchored at 24 to wheel cage 25. Upon the reeling in of cable 22, the wheel cage 25 pivots about hinge 26 that connects it to the wheel cage platform 27 and this action permits the wheel cage to fold upward and assume the position shown in phantom outline in FIG. 1. At this position, the trailer hitch 28 on tongue 2 will have been engaged to a prime mover (not shown), and the vehicle will be ready for normal road travel.

Figure 2:
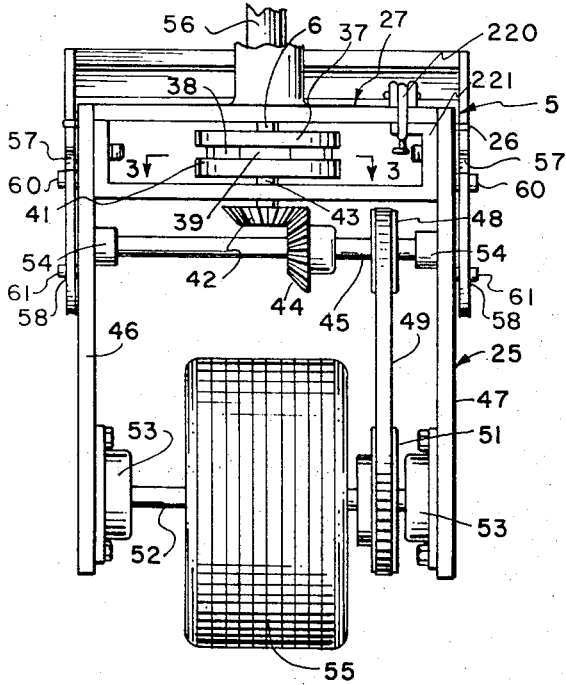
FIG. 2 is a detail front view of the power drive wheel and assembled structure detached from the remainder of the mechanism.
Figure 3:
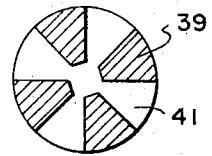
FIG. 3 is a view taken along the lines 3—3 of FIG. 2 showing one set of clutch teeth in cross-section.

The drive shaft 9 is journalled in both top plate 7 and submounting plate 5 and contains a small sprocket 30 in alignment with a larger sprocket 31, so that the latter is turned thru chain 32. Shaft 33 is rotated by sprocket 31 and simultaneously rotates sprocket 34 which turns chain 35 and larger sprocket 36, which directly drives shaft 6. The lower end of shaft 6 contains a clutch plate 37 (FIG. 2) and its associated clutch teeth 38, which mesh with and engage clutch teeth 39 of lower clutch plate 41 (FIG. 3). When the wheel cage 25 is pivoted upward about hinge 26, the clutch plates separate and there is no longer a direct drive thru the clutch comprising clutch plates 37 and 41, and their integral teeth 38 and 39. But when the clutch plates are engaged and drive shaft 6 is rotating, the bevel gear 42 is rotated by its shaft 43 and drive bevel gear 44 and shaft 45 which is rotatably supported from journal boxes 54 in sidewalls 46 and 47 of cage 25.

Sprocket 48 and its chain 49 drive sprocket 51 and shaft 52 which is supported in journal boxes 53 on each side wall 46 and 47. The shaft 52 then drives ground engaging wheel 55 and the vehicle and mechanism move forward. The handle 56 includes opposite opening slots 57 and 58 which engage projecting bolts 60 and 61, and this handle and connection provides the steering means for the vehicle when the mover mechanism is in use.

Operator clutch control handle 208 is moved to apply tension to the normally slack cable 207 by means of its cable drum 200. This tension is transmitted thru guides or rollers 201, 202, and 203 to L-shaped lever 206 which pivots the lever arm of 206 and pulley shaft 205 about pivot 208 so that pulley 204 is moved into operating engagement with drive belt 13 and cause belt 13 to drive pulley 14. Rollers 201A may swivel thru swivel mountings to facilitate steering movements of handle 56.

In FIG. 1 it is seen that even though wheel 55 rotates only in one direction (to cause forward travel of the vehicle), the handle 56 may be quickly removed and engaged against bolts 60A and 61A, after wheel cage 25 rotates 180°. This will permit the vehicle to be moved in a reverse direction without the need of expensive reversing mechanism. When this is done and wheel cage 25 is rotated, the cable 22 being slack follows the wheel cage, but does not interfere with the steering operation. The handle 56 is equipped with a universal joint 59 which will permit the operator to move from side to side for better visibility when moving the trailer.

When crank handle 65 is rotated, teeth 70 of the load lifting and lowering gear 71 will engage and lift serrations 72, and hence shaft 73 which is anchored to top plate 27 of wheel housing 74. Prior to the lifting action of shaft 73 upward in tube 4, the hitch 28 will have been engaged with the ball of the prime mover and the handle 56 will have been removed. As the lift progresses until the wheel structure 74 is well above the ground, the stowing cable winch 10 is rotated by handle 15 (or valve and motor 81a and 16 of FIG. 5) and cable 22 is reeled in, lifting wheel cage 25 to its stowed position.

To place mover mechanism A in its utility position, the reverse procedure is followed, and firstly, stowing unit 18 is activated when cable winch 10 is rotated by handle 15 or power unit 16 to pay out cable 22 and permit wheel cage 25 to lower by gravity about its hinge 26 until it engages wheel housing platform 27. At this point, a C-clamp 220 is caused to engage C-channel 221 of wheel cage 25. Next, the lift unit 11 is activated by crank 65, or control valve 81b and power unit 17, turning gear 71 in a direction to lower shaft 73 and wheel housing 74 to its ground engaging position and this action may be continued until hitch 28 is raised off its engaged socket on a prime mover (not shown). Thereafter, the lift unit is used to raise or lower the tongue portion 2 as required for levelling purposes.

Figure 5:
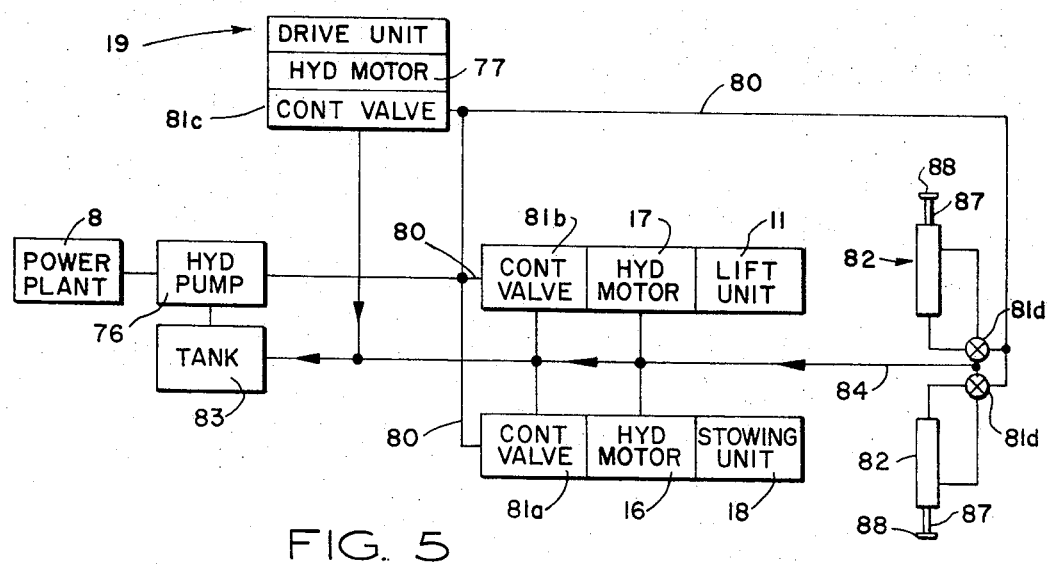
FIG. 5 is a schematic drawing of a power operated system wherein the drive, lift, stowing units and vehicle load levellers are hydraulically controlled.

When it is desired to move the vehicle B when the latter is separated from its prime mover (auto, tractor, etc.), the drive unit 19 is employed. This unit 19 may be power driven from motor 8 thru the pulley-sprocket sequence as previously described or it may be driven from motor thru hydraulic pump 76 and control valve 81c and hydraulic motor 77 (as shown in FIG. 5). In this arrangement, the drive unit 19 would be reversible and the technique of switching handle 56 would not be utilized.

One of the advantages of the described embodiment is that the mover wheel unit stays with the vehicle at all times and is always ready for instant service. When it is stowed, it is out of the way of other functions of the vehicle. And when it is in use, the wheel unit is highly controllable from the front of the vehicle being moved and the mover per se does not require any more ground space than the trailed portion of the vehicle per se.

Figure 4:
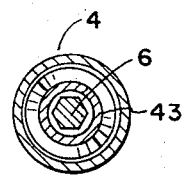
FIG. 4 is a cross-sectional view taken along the lines 4—4 of FIG. 1.

FIGS. 3 and 4 are detail views showing the construction of parts whose detail is hidden in the other figures.

FIG. 5 discloses the hydraulic system used with the previously described embodiment when it is desired that all operations be power controlled. The power plant or motor is represented by block 8, and is shown to rotate hydraulic pump 76 to deliver pressurized fluid thru lines 80 to control valves 81a – 81d of all of the working units, such as hydraulic motors 16, 17, 77 and hydraulic jacks 82 and then to exhaust line 84 back thru hydraulic tank 83. The hydraulic circuit just described is a unitary power system using the same medium of power for all functions.

FIGS. 6 and 7 show the application of the load levellers 82 of FIG. 5 to a trailer T. When the piston legs 87 are extended and their swivel pads 88 engage the ground G as shown, or preferably vertically, each piston may be controlled separately thru its valve 81 to level the vehicle T. When the leveller jacks 82 are not in use, the pistons 87 are retracted and the jack folded up into the bumper 89 (shown in phantom outline in FIG. 7 by pivoting the jack about its single mounting bolt 90.

FIGS. 8–12 represent another embodiment of the load mover of this invention which provides a separate unitary load mover which by its unique concept and construction may be used to lift, transport, maneuver and deposit or stow extremely large, bulky or heavy loads with great facility. This embodiment, referred to as C, includes a main frame 101 supported from the ground by drive wheels 102 and follower wheel 103, and guided by steering yoke 104. A power plant 105 is mounted on frame 101 and thru a transmission system identified generally at 106, and clutch system 121, the speed of the power plant is reduced to the desired travel speed and changed to the desired travel direction.

When it is desired to utilize load mover C to engage a vehicle such as a trailer, the mover C is maneuvered to a position near the ball engaging cup of the hitch unit (indicated in phantom outline at 107) on the vehicle and this hitch unit is inserted onto and attached to ball joint 108 mounted on the travelling platform 109 on inclined tube track 110.

The ball carrying platform 109 supports ball 108 in an upright position at all times while moving up inclined track 110. Platform 109 comprises a top plate 111 attached to two spaced apart angle irons 112, which straddle track 110 in guided relation and are joined at their rearmost lower edge by cross bar 136. The tube track 110 is slotted along its underside as shown at 113 in FIG. 11, and houses an internally located lead screw 114, which is rotated by jack crank 115 at the top end of tube 110. Travelling nut 116 on lead screw 114 is attached to cross bar 136 by bolt 117, so that as the crank 115 is rotated in one direction, the travelling nut 116 climbs up the track 110 carrying the cross bar 136 and lifting platform 109 with it. And when the crank 115 is rotated in a reverse direction, the platform 109 will be lowered along track 110 under controlled conditions.

It will be noted in FIG. 8 that the track 110 is inclined upwardly at an acute angle to the ground; and that the platform 109, (carrying ball hitch 108) when being adjusted upward in response to an upward cranking of jack crank 115, is also simultaneously moving vertically relative to the track 110, and moving in a direction away from the drive wheel 102 and inwardly of the vehicle C.

The power plate 105 of embodiment C thru a gear reduction system 118 drive output pulley 119, which thru belt 120, when clutch 121 is engaged, turns transmission pulley 122 and hence transmission output shaft 123 of transmission 124 at a speed dependent on the setting of transmission shift lever 125. Shaft 123 in turning, drives chain and sprocket system 126 to rotate axle 127 and hence wheels 128.

The clutch system 121 is comprised of an idler pulley 129 which is made to engage belt 120 when clutch lever 121A is moved to its "engage" position and moves pulley support arm 121B and pulley 129 into firm engagement with belt 120. When lever 121A is moved to its "disengage" position, the pulley 129 moves out of contact with belt 120 and the belt rotates loosely or not at all, and the transmission 124 may be shifted thru its shift lever 125.

When it is desired to use the utility vehicle C as a lawn mower, the auxiliary unit 140 is attached to the lift platform 109 in such a manner that a reel type mower 141 is pushed ahead of the vehicle C and functions as a power mower since the blades 142 of a reel type mower rotate with the ground engaging wheels 143. The side arms 144, journalled to the center axle 145 of the mower 141, are supported and connected at their upper ends by cross member 146. Ball engaging cup member 147 is supported by and extends from the underside of cross member 146 in a manner to engage ball 108 of lift platform 109. Side bars 148 straddle platform 109 at installation to position mower unit 140 and yet permit its pivotal movement thru attaching bolts 149. The bolts 149 threadedly engage openings in cross member 146 and tightem thereto, but in such a way as not to bind against side arms 144, so that these arms may freely pivot about their attaching bolts 149. This action permits the mower unit 140 to ride freely over the terrain being mowed.

The modified embodiment shown in FIG. 12 includes the power plant 105 and drive arrangement shown in FIG. 8, and in addition includes a power lifting system, identified generally at 130, which comprises basically a hydraulic pump 131, a reservoir tank 132, an elongated hydraulic jack 133 and a control valve 134 supported on handle 104 for ready access by the operator.

The usual function of the hydraulic jack 133 is to power raise and power lower the ball platform 109A to adjust the height of a vehicle tongue attached to ball 108 thereon (not shown in FIG. 12, but shown at 107 in FIG. 8). To accomplish this purpose, the piston 135 is attached to the underside of platform 109A by means of its cross bar 136A. To raise platform 109A, valve 134 directs pressurized fluid thru line 141 to the lower end of piston 135 which is thereby retracted into cylinder 137 and the bar 136A, platform 109A and ball 108 will all travel upward along inclined track 138 (similar in function to tube 110). The platform 109A is lowered by the reversing valve 134 and directing pressurized fluid thru line 140 into the upper end of cylinder 137 and exhausting fluid thru line 141 back thru valve 134 to tank 132.

When it is desired to use the vehicle C' to perform the function of a lift fork truck, an auxiliary fork structure 150 is securely attached to the lift platform 109A and may itself be raised and lowered thru the described hydraulic system. The fork structure 150 includes horizontally extending members 157 spaced apart the distance needed to straddle cross bar 136A so that these parts may be attached by bolts 152 threading into tapped openings 153 on each side of bar 136A. The third attachment point is cup 154 which engages ball 108 and is itself suspended from cross member 155 extending between vertical members 156 upstanding from fork arms 157. The entire lift structure 150 is adapted to operate between side frame members 158 of the main frame 101A without interference with any structure or functional elements of the mover C'. In some instances it will be desirable to utilize the lift forks formed by arms 157 to engage a trailer tongue that is resting on the ground and raise it up onto a sawhorse or similar support means. And of course the vehicle C' will have utility apart from its operation as a trailer mover, and it can perform moving, rolling (by replacing mower 141 with a solid weighted roller), and other functions the same as embodiment C.

The contents of the disclosures of the specifications of the prior art patents mentioned in this specification are incorporated herein and made a part hereof by reference.

From the foregoing description it will be readily seen that there has been produced a device and assemblage which substantially fulfills the objects of the invention as set forth herein, but this invention is not limited to the construction shown and may be made in many ways within the spirit of the invention and the scope of the appended claims.

I claim:

1. A mover for a load, comprising, in combination:
   a. a frame,
   b. at least one power driven wheel supporting said frame from the ground,
   c. a power plant supported on said frame,
   d. coupling means between said power plant and said wheels,
   e. lifting means on said mover for raising and lowering said load,
   f. a second lifting means for folding said wheel and stowing said wheel when said mover is not in use.

2. A load mover as in claim 1, wherein at least one of said lifting means is power operated.

3. A load mover as in claim 1, wherein said lifting means for raising and lowering said load comprises a tubular guide structure having a side opening therein, an axially moving tubular member in said guide structure, and means extending into said opening for moving said member and raising and lowering said load therewith.

4. A load mover as in claim 3, wherein said member includes teeth, means for moving said member by cooperative engagement with said teeth.

5. A load mover as in claim 3, wherein said member includes parallel serrations and said means for moving said member includes teeth for engaging said serrations.

6. A load mover as in claim 3, wherein the lower end of said member engages a wheel structure including a load propelling wheel therein, drive means intermediate said power plant and said wheel, means in said member thru which said drive means may transmit power.

7. A load mover as in claim 6, wherein the lower end of said member engages a wheel structure including a load propelling wheel therein, drive means intermediate said power plant and said wheel, and wherein said tubular member defines an opening thru which said drive means extends.

8. A load mover as in claim 6, wherein said wheel rotates in one direction and propels said load in a forward direction, and said wheel structure includes means to cause said wheel to rotate in said one direction and propel said load in the opposite direction from said forward direction.

9. A load mover as in claim 6, wherein said wheel structure comprises a platform and a wheel cage hinged thereto and comprising remote leverage means for pivoting said wheel cage about said hinge to move it to a stowage location.

10. A mover for a vehicle, comprising in combination,
a. a frame common to said mover and said vehicle,
b. at least one power driven wheel unit supporting said frame from the ground,
c. a power plant supported on said frame and outputting power in one direction of movement,
d. a lifting unit for raising and lowering said frame,
e. a lifting unit for stowing said wheel,
f. coupling means between said power plant and said power driven wheel,
g. and transmissionless means to reverse the direction of power travel of said wheel unit while maintaining said one direction of movement.

11. A load mover as in claim 1, wherein said frame is common to said mover and said load and wherein at least one of said lifting means is hydraulically operated and wherein said load includes hydraulic levellers actuated from the same system as said lifting means.

12. A utility vehicle, comprising:
a. a frame,
b. a power plant on said frame,
c. at least one power driven wheel supporting said frame from the ground,
d. said power plant in driving relation with said wheel,
e. lifting means on said frame including a traveling hitch,
f. inclined track means on which the hitch is movable substantially vertically and longitudinally, said inclined track means causing said hitch when being adjusted upwardly to traverse an acute angle of travel relative to the ground and in a direction away from said wheel and inwardly of the vehicle.

* * * * *